US009719630B1

(12) United States Patent
Hurley

(10) Patent No.: US 9,719,630 B1
(45) Date of Patent: Aug. 1, 2017

(54) PIVOTING SUPPORT ASSEMBLY

(71) Applicant: Lyndon J. Hurley, Sioux Falls, SD (US)

(72) Inventor: Lyndon J. Hurley, Sioux Falls, SD (US)

(73) Assignee: Hurco Technologies, Inc., Harrisburg, SD (US)

(*) Notice: Subject to any disclaimer, the term of this patent is extended or adjusted under 35 U.S.C. 154(b) by 0 days.

(21) Appl. No.: 15/018,522

(22) Filed: Feb. 8, 2016

(51) Int. Cl.
*A01G 25/09* (2006.01)
*F16M 13/02* (2006.01)
*F16C 11/10* (2006.01)

(52) U.S. Cl.
CPC ............. *F16M 13/02* (2013.01); *F16C 11/10* (2013.01); *F16M 2200/021* (2013.01); *F16M 2200/06* (2013.01)

(58) Field of Classification Search
CPC ............. F16M 13/02; F16M 2200/021; F16M 2200/06; F16C 11/10
USPC .......................... 248/647; 137/899; 702/114
See application file for complete search history.

(56) References Cited

U.S. PATENT DOCUMENTS

| | | | |
|---|---|---|---|
| 1,979,340 A | 11/1934 | Norman | |
| 2,214,389 A | 9/1940 | Wahlmark | |
| 2,548,146 A | 4/1951 | Ferris | |
| 2,548,147 A | 4/1951 | Ferris | |
| 2,746,720 A | 5/1956 | Cannon | |
| 3,093,946 A | 6/1963 | Pitt | |
| 3,216,511 A | 11/1965 | Ladd | |
| 3,417,953 A | 12/1968 | Hillquist | |
| 3,565,372 A | 2/1971 | Jones | |
| 3,572,380 A | 3/1971 | Jackson | |
| 4,063,359 A | 12/1977 | Luscombe | |
| 4,080,530 A | 3/1978 | Krogsrud | |
| 4,089,448 A | 5/1978 | Traeger | |
| 4,114,426 A | 9/1978 | McLean | |
| 4,166,602 A | 9/1979 | Nilsen | |
| 4,174,733 A | 11/1979 | Eidsmore | |

(Continued)

FOREIGN PATENT DOCUMENTS

EP        089412        9/1983

OTHER PUBLICATIONS

The Wachs Company, "Automated Valve Operating Systems", pp. 1-6.

(Continued)

*Primary Examiner* — Gwendolyn Baxter
(74) *Attorney, Agent, or Firm* — Jeffrey A. Proehl; Woods, Fuller, Shultz & Smith, P.C.

(57) ABSTRACT

A pivoting support assembly with a selective position locking capability may comprise a base, a first support arm movable with respect to the base, a first pivot joint pivotally mounting the first support arm to the base, and a first position locking assembly configured to lock a selected position of the first support arm with respect to the base. The first position locking assembly may comprise a first hydraulic motor mounted on the first pivot joint and having a fluid input and a fluid output with a fluid path defined therebetween such that fluid movement on the fluid path between the fluid input and the fluid output operates the first hydraulic motor. The first position locking assembly may comprise a first lock valve in communication with the first hydraulic motor and configured to selectively block fluid movement through the fluid path of the motor.

17 Claims, 6 Drawing Sheets

(56) References Cited

U.S. PATENT DOCUMENTS

| | | | |
|---|---|---|---|
| 4,183,489 A | 1/1980 | Copher | |
| 4,278,864 A | 7/1981 | DeFacci | |
| 4,463,858 A | 8/1984 | Bilas | |
| 4,478,041 A | 10/1984 | Pollman | |
| 4,481,770 A | 11/1984 | Lohbauer | |
| 4,523,286 A | 6/1985 | Koga | |
| 4,561,459 A | 12/1985 | Jackman | |
| 4,600,364 A | 7/1986 | Nakatani | |
| 4,883,249 A | 11/1989 | Garland | |
| 4,961,471 A | 10/1990 | Ovens | |
| 4,987,690 A | 1/1991 | Aaldenberg | |
| 5,299,770 A | 4/1994 | Sayles | |
| 5,330,014 A | 7/1994 | Wagner | |
| 5,373,978 A | 12/1994 | Buttchen | |
| 5,381,996 A | 1/1995 | Arnemann | |
| 5,398,721 A | 3/1995 | Pryor | |
| 5,503,423 A | 4/1996 | Roberts | |
| 5,540,006 A | 7/1996 | Lloyd | |
| 5,560,130 A | 10/1996 | Bapst | |
| 5,730,345 A | 3/1998 | Yeckley | |
| 5,746,404 A | 5/1998 | Merko | |
| 5,775,560 A | 7/1998 | Zahn | |
| 5,809,779 A | 9/1998 | Bruso | |
| 5,810,051 A * | 9/1998 | Campagna | E03B 9/00 137/899 |
| 5,876,005 A | 3/1999 | Vasconi | |
| 5,937,373 A | 8/1999 | Ferrar | |
| 6,009,905 A | 1/2000 | Arnemann | |
| 6,056,065 A | 5/2000 | Campbell | |
| 6,087,945 A | 7/2000 | Yasuda | |
| 6,125,868 A | 10/2000 | Murphy | |
| 6,129,371 A | 10/2000 | Powell | |
| 6,131,391 A | 10/2000 | Poorman | |
| 6,142,180 A | 11/2000 | Woodling | |
| 6,478,528 B1 | 11/2002 | Asbury | |
| 6,550,734 B1 | 4/2003 | Spadea | |
| 6,701,913 B1 | 3/2004 | LeDuc | |
| 6,821,075 B2 | 11/2004 | Van der Horn | |
| 7,017,406 B1 | 3/2006 | Cressman | |
| 7,334,606 B1 | 2/2008 | Hurley | |
| 7,376,529 B1 | 5/2008 | Hurley | |
| 7,415,376 B1 * | 8/2008 | Hurley | F16K 31/46 415/13 |
| 7,455,124 B1 | 11/2008 | Hurley | |
| 7,607,624 B1 | 10/2009 | Hurley | |
| 7,917,324 B2 | 3/2011 | Hurley | |
| 7,987,923 B1 | 8/2011 | Hurley | |
| 8,025,078 B2 * | 9/2011 | Ferrar | B25J 5/007 137/899 |
| 2001/0053970 A1 | 12/2001 | Ford | |
| 2005/0075817 A1 | 4/2005 | Kah | |
| 2005/0076965 A1 | 4/2005 | Buckner | |
| 2005/0166350 A1 | 8/2005 | Buckner | |
| 2005/0222933 A1 | 10/2005 | Wesby | |
| 2008/0255770 A1 | 10/2008 | Hurley | |
| 2008/0281534 A1 | 11/2008 | Hurley | |
| 2009/0319572 A1 | 12/2009 | Bernard | |

OTHER PUBLICATIONS

E.H. Wachs Companies, "Truck Mounted Valve Operator Model TM-7", Product Manual, Jan. 2004, pp. 1-55.
E.H. Wachs Companies, "Wachs ValveCard 1.2", Product Manual, Sep. 1998, pp. 1-26.
Holden & Brook Limited, Packaged Fire Hydrant Pump Sets, Brochure, Apr. 1989, pp. 1-4, Manchester, England.
Macarena Cavestany Olivares, "Characterization of Irrigation Hydrants and Influence of Their Wrong Behavior on the Performance of an Irrigation Network", Aug. 23, 2006, pp. 1-90.
Telog Instruments, Hydrant Pressure Monitoring, brochure, available at www.telog.com/flash/downloads/hpr_suite.pdf.
National Fire Protection Association, "Recommended Practice for Fire Flow Testing and Marking of Hydrants", 2002 Edition, 18 pages.
Exhibit A: Invoice of Hurco Technologies dated Jul. 23, 2002.
Exhibit B: Photograph of Prototype invoiced on Jul. 23, 2002.
Exhibit C: Photograph of Prototype invoiced on Jul. 23, 2002.
Exhibit D: Photograph of Prototype invoiced on Jul. 23, 2002.
Exhibit E: Photograph of Prototype invoiced on Jul. 23, 2002.

* cited by examiner

PIVOTING SUPPORT ASSEMBLY

BACKGROUND

Field

The present disclosure relates to supports and more particularly pertains to a new pivoting support assembly for providing a pivotable support that is selectively lockable in a variety of positions.

SUMMARY

The present disclosure relates to a pivoting support assembly with a selective position locking capability may comprise a base, a first support arm movable with respect to the base, a first pivot joint pivotally mounting the first support arm to the base, and a first position locking assembly configured to lock a selected position of the first support arm with respect to the base. The first position locking assembly may comprise a first hydraulic motor mounted on the first pivot joint and having a fluid input and a fluid output with a fluid path defined therebetween such that fluid movement on the fluid path between the fluid input and the fluid output operates the first hydraulic motor. The first position locking assembly may comprise a first lock valve in communication with the first hydraulic motor and configured to selectively block fluid movement through the fluid path of the motor.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, as well as the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 1 is a schematic perspective view of portions of a new pivoting support assembly according to the present disclosure.

DETAILED DESCRIPTION

Figure 1:
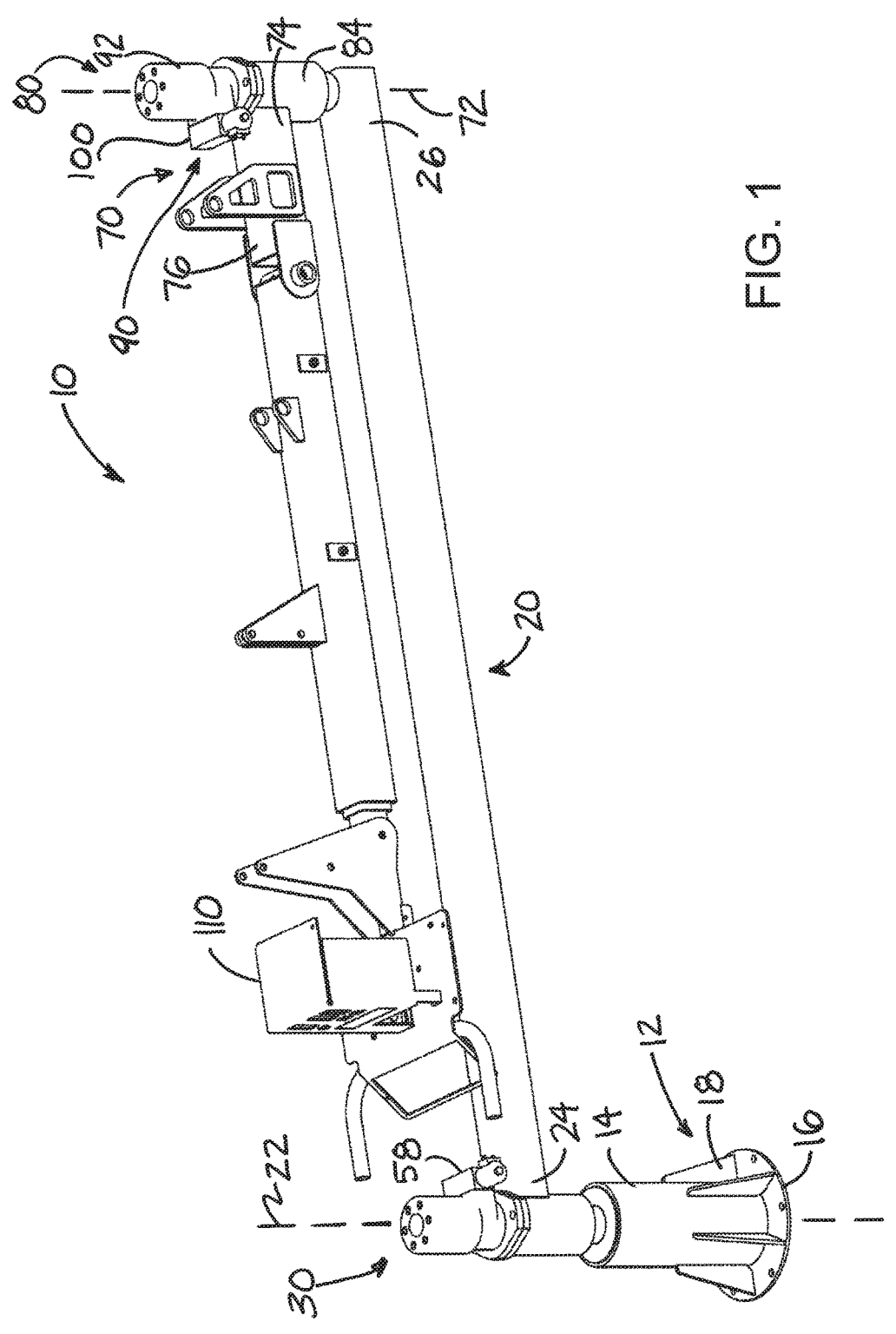
Figure 2:
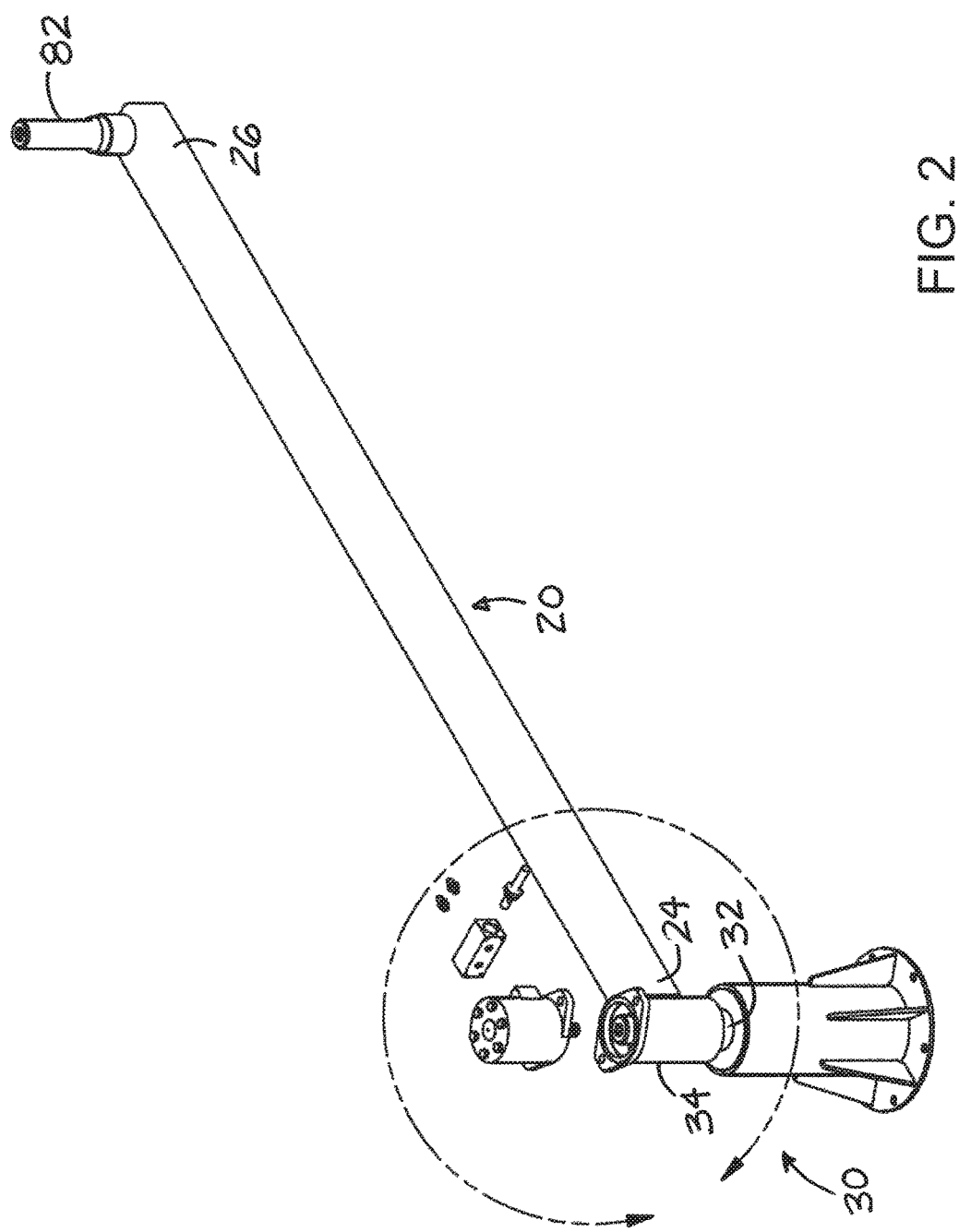
FIG. 2 is a schematic perspective view of a portion of the support assembly with portions exploded to show detail, according to an illustrative embodiment.
Figure 3:
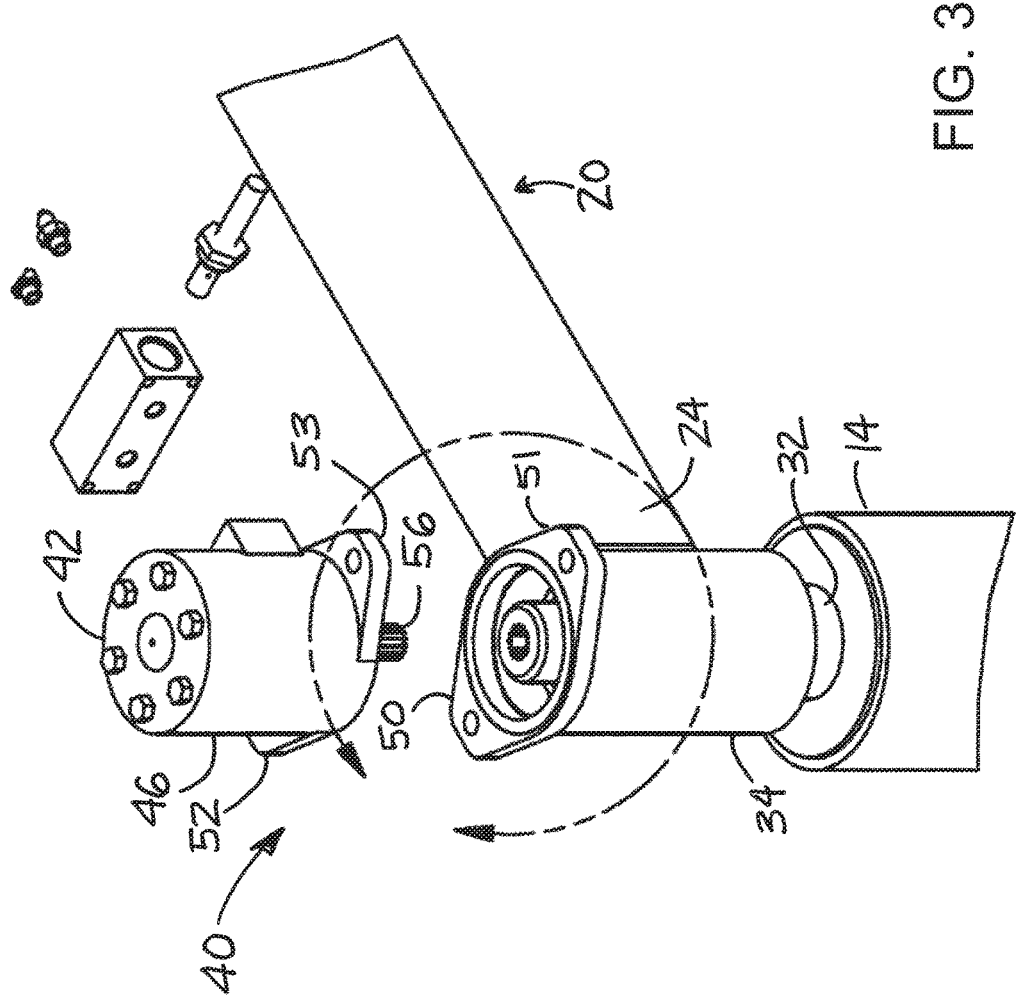
FIG. 3 is a schematic perspective view of an enlarged portion of the support assembly shown in FIG. 2 with portions exploded to show detail, according to an illustrative embodiment.
Figure 4:
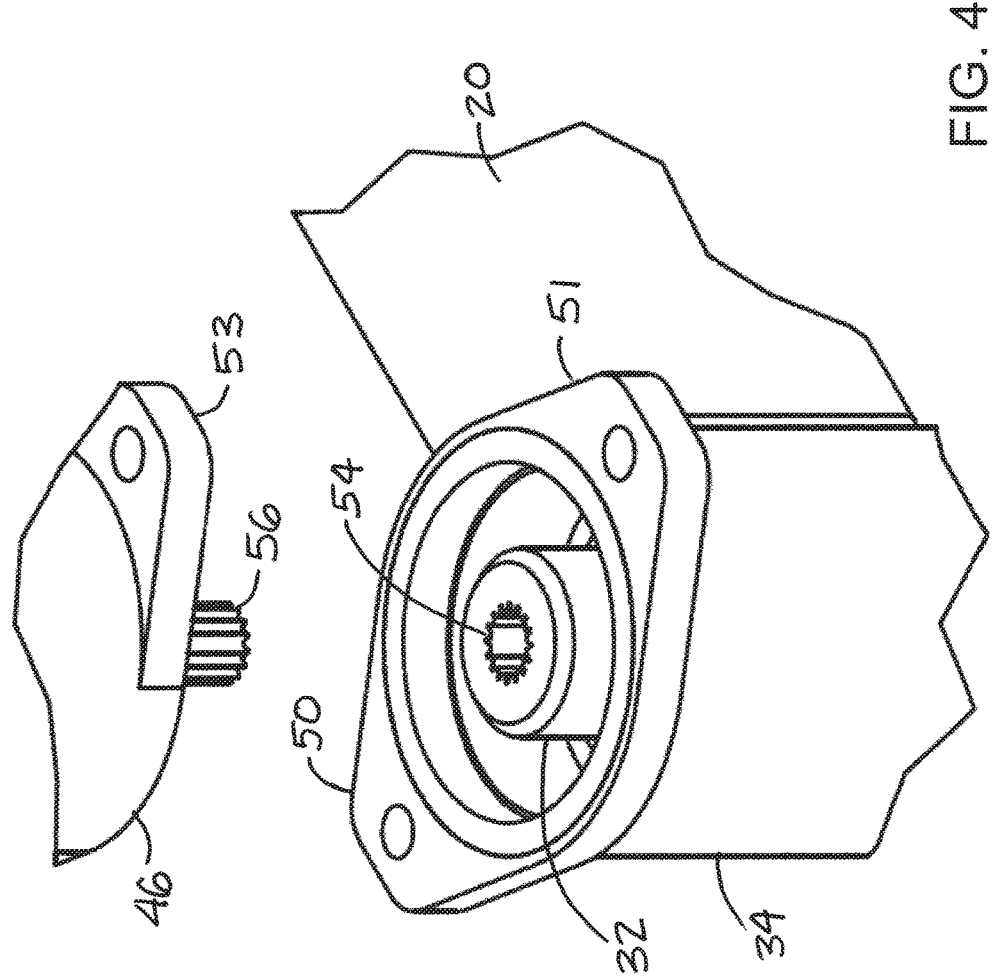
FIG. 4 is a schematic perspective view of a further enlarged portion of the support assembly shown in FIG. 3 with portions exploded to show detail, according to an illustrative embodiment.
Figure 5:
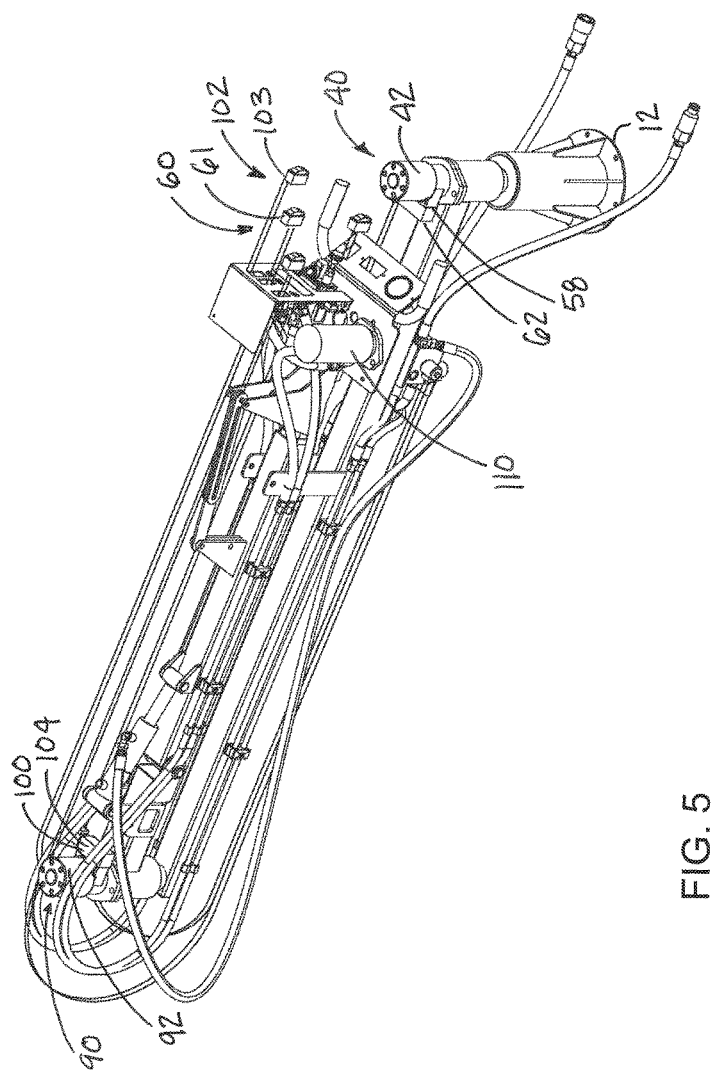
FIG. 5 is a schematic perspective view of the pivoting support assembly with hydraulic and electrical elements included, according to an illustrative embodiment.
Figure 6:
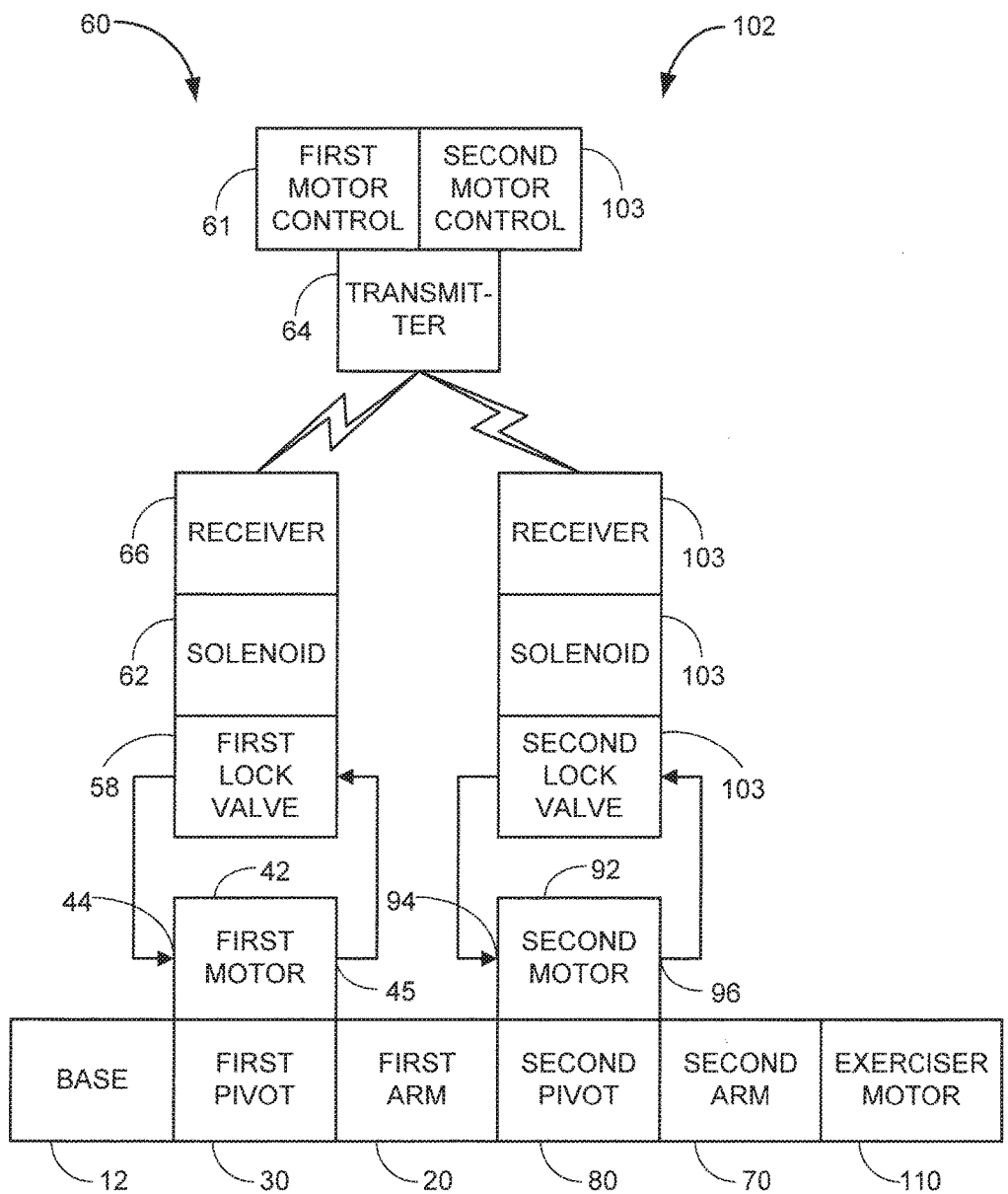
FIG. 6 is a schematic block diagram of a system employing the pivoting support assembly, according to an illustrative embodiment.

With reference now to the drawings, and in particular to FIGS. 1 through 6 thereof, a new pivoting support assembly embodying the principles and concepts of the disclosed subject matter will be described.

The applicant has recognized that while brakes, and in particular brakes including a disk and caliper acting on the disk, have been effectively utilized to selectively hold the position of pivoting elements (such as a support arm with respect to a base or with respect to another arm on which the support arm is mounted), such disc and caliper brake structures often suffer from a number of drawbacks. One significant drawback recognized by the applicant is that the caliper of the brake structure requires hydraulic power or pressure in order to "brake" or hold the disc against rotation with respect to caliper, and when hydraulic pressure is no longer supplied to the brake structure, the disc is no longer held and is thus unrestrained against rotation with respect to the caliper. The disc and caliper brake structure is therefore unable to lock the pivoting elements on which the brake structure is mounted against movement, and fails to provide "failsafe" operation of locking the elements against rotation when hydraulic pressure is no longer applied. The disk and caliper brake structure is thus unable to secure the elements when hydraulic pressure is lost unexpectedly through equipment failure or when the power creating the hydraulic pressure is simply turned off after operation of the associated apparatus is completed. Auxiliary locking structures must thus be provided for securing the pivotable elements when the associated apparatus is not being operated but is being transported or stored and pivot movement is undesirable.

A further disadvantage of the disc and caliper brake structure is the hoses and valves required to provide hydraulic power to the disc and caliper structure as well as provide control of the disc and caliper structure, which add cost and complexity to the associated apparatus, particularly is the disc and caliper structure is remotely located from either the hydraulic power source or the controls or both. For example, in the case of a pivotable support arm or arms, hydraulic fluid supply lines need to be run along the lengths of support arms as well as bridge across pivoting joints between the arms. These necessary fluid lines can greatly increase the complexity of manufacture, maintenance, as well as the expense involved in the manufacture and ultimate price of the associated apparatus. Moreover, pressurized hydraulic fluid always has the potential for causing leaks in the supply hoses which can be hazardous and necessitate a repair.

A still further disadvantage of using a disc and caliper brake structure to selectively hold a support arm in position is the inherent resistance between the friction pads utilized on the caliper and the surface of the disc even when hydraulic pressure is not being applied to the caliper to hold the position of the disc with respect to the caliper. Moreover, the surface of the iron or steel disc in inevitably exposed to moisture when the associated apparatus is employed outdoors, and thus rust may form on the surface of the disc, particularly during periods of non-use of the apparatus when the brake pad is unable to slough the rust off of the disc surface. Moreover, periodic replacement of the brake pads on the caliper is necessary to remain effective, which adds an additional maintenance element to the structure.

The applicant has recognized that would be advantageous to provide selective braking of the pivot movement of a support arm with respect to a base or another support arm that minimizes if not eliminates these disadvantages of the conventional disc and caliper brake structure, particularly if the replacement structure is simpler to manufacture and maintain and operate than the disc and caliper structure.

The applicant has thus devised a locking structure that is particularly effective in locking the position of pivoting elements with respect to each other, while providing advantages such as, for example, less manufacturing complexity, less maintenance, and thus lower costs, while also providing the functional improvements such as, for example, the capability of locking the pivoting elements in position with respect to each other even when the associated apparatus is powered down and not being operated.

The applicant has thus devised a locking structure for a support arm that utilizes a hydraulic motor (or pump) and the inherent ability of the hydraulic motor to permit or prevent rotational movement of the shaft of the hydraulic motor depending upon the free movement of hydraulic fluid through the motor. For example, one element of the hydraulic motor, such as the housing of the motor, may be fixed with respect to a base or a support arm, while another element of the hydraulic motor, such as the rotor and connected shaft, may be mounted to a support arm to provide a selective locking capability between the base or support arm and the movable support arm at a rotational or pivotable joint.

The disclosure is thus directed in some aspects to a pivoting support assembly 10 which has a selective position locking capability provided to selectively resist or prevent movement of elements of the support assembly with respect to each other. An illustrative support assembly 10 may include a base 12 which may be mounted on or supported on any suitable structure, and may comprise a mobile base which is readily moved across the ground surface, such as a towable trailer or a vehicle with a prime mover. Optionally, the base 12 may be relatively stationary. In some embodiments, the base 12 includes a post 14 which may extend substantially vertically, but in other embodiments may extend substantially horizontally. The base may also include a base plate 16, and the post 14 may extend from the base plate such as in an upward direction. The base plate 16 may extend in a plane that is oriented perpendicular to an axis of the post, and illustratively the base plate may extend in a substantially horizontal plane oriented perpendicular to the substantially vertically oriented post. Optionally, a plurality of gussets 18 may extend between the post 14 and the base plate 16 in order to support and reinforce the connection between the post and base plate. It should be recognized that in some embodiments the base may be a movable element, such as a base arm.

The supporting assembly 10 may also include a first support arm 20 which may be movable with respect to the base 12. The first support arm may be pivotable with respect to the base, and may be pivotable with respect to the base about a first pivot axis 22. In some embodiments, the first pivot axis 22 is substantially vertically oriented, and the first support arm 20 is movable or pivotable in a substantially horizontal plane, although other orientations may be employed. The first support arm 20 may have a first inboard end 24 and a first outboard end 26, and the inboard end 24 may be positioned adjacent to the base while the outboard end 26 may be located relatively remote to the base. The support assembly 10 may also include a first pivot joint 30 which pivotally mounts the first support arm 20 to the base 12, and may be located at the first inboard end 24 of the first support arm. In some embodiments, the first pivot joint 30 may include a first spindle 32 and a first collar 34 which receives the first spindle. The first spindle 32 may be mounted on the base 12 and the first collar may be mounted on the first support arm, although in some embodiments the mounting of the spindle 32 and the collar 34 on the base and arm may be reversed.

The support assembly 10 may also include a first position locking assembly 40 which is configured to lock a selected position of the first support arm 20 with respect to the base. The first position locking assembly may be located at the first pivot joint 30. The first position locking assembly 40 may comprise a first hydraulic motor 42 which located at, and may be mounted on, the first pivot joint 30. The first hydraulic motor 42 may have a fluid input 44 and a fluid output 45 with a fluid path defined between the input 44 and the output 45. In some embodiments, the first hydraulic motor may comprise a housing 46 and a rotor with the rotor being rotatable relative to the housing. The fluid path may be characterized by the functionality that fluid movement on the fluid path between the input 44 and output 45 tends to operate the first hydraulic motor and may cause the rotor to rotate with respect to the housing 46 (or at least may apply torque to the rotor that tends to rotate the rotor with respect to the housing). Conversely, the prevention of fluid movement along the fluid path through the motor 42 may prevent the motor from being operated, such as preventing the rotor from being able to rotate with respect to the housing.

The housing 46 may be fixed to one element selected from the base element and the first support arm element, and the rotor may be fixed to the other element selected from the base element and the first support arm element. In some embodiments, the housing 46 may be fixed to the first support arm 20 while the rotor may be fixed to the base 12. Illustratively, the housing 46 may be fixed to the first collar of the first support arm, and the rotor may be fixed to the first spindle of the base 12 although other arrangements may be utilized. The first collar 34 of the support arm may have at least one first mount ear 50, 51 which is configured to be fastened to at least one mount ear 52, 53 on the housing 46 of the first hydraulic motor. Further, the first spindle 32 may have a bore 54 formed in the ends of the spindle and the rotor of the first hydraulic motor may have an output shaft 56 which is inserted into the bore 54 of the spindle. In some embodiments, the output shaft 56 and the bore 54 may have complementary splines to facilitate rotation of the rotor and the first spindle as a unit with respect to the first collar 34 and the first support arm.

The support assembly 10 may also include a first lock valve 58 which is in communication with the first hydraulic motor 42 of the first position locking assembly. The first lock valve 58 may be configured to selectively block fluid movement through the fluid path of the motor 42. The first lock valve 58 may have a movement condition which permits substantially free flow of fluid through the fluid path of the first fluid motor, and a lock condition which resists free flow of the fluid through the fluid path of the first fluid motor. The movement condition may correspond to a substantially open condition of the first lock valve 58 and the lock condition may correspond to a substantially closed condition of the first lock valve. The first lock valve 58 may be in fluid communication with the fluid input 44 and fluid output 45 of the first hydraulic motor 42 and a lock valve 58 may be fluidly connected to the fluid input and fluid output.

The movement of the first lock valve 58 to the lock condition may resist or prevent movement of the fluid through the flow path of the first hydraulic motor, and thus the rotation of the rotor and the output shaft with respect to the housing, and may thus resist or prevent the rotation of the collar with respect to the spindle, and by extension, rotation of the first support arm with respect to the base. Conversely, movement of the first lock valve to the movement condition the may allow or permit movement of the fluid through the flow path of the first hydraulic motor, and thus the rotation of the rotor and the output shaft with respect to the housing, and may thus permit rotation of the collar with respect to the spindle, and by extension, rotation of the first support arm with respect to the base. In the movement condition, rotation of the first support arm with respect to the base is not resisted when a rotational force is applied to the first support arm, such as, by example, when the operator pushes on the first support arm at a location that is spaced from the first pivot axis. Free rotation of the first support arm may permit adjustment of the position of the first support arm to the desired orientation, and then the first lock valve may be moved to the lock condition to secure the first support arm in the desired position until the valve is again moved to the movement condition.

The first position locking assembly 40 may also include a first control 60 which is configured to actuate the first lock valve 58 between the movement condition and the lock condition. The first control 60 may have a control switch 61 with a movement position in which the first lock valve is in the movement condition and thus presents minimal resistance to fluid flow along the fluid path (and a lock position in which the first lock valve is in the lock condition) and presents a substantial if not complete blockage of movement of fluid along the fluid path. In some embodiments, the first control 60 may comprise an electrically operable device, and an electrically operable device may for example comprise a solenoid 62. The first control 60 may also comprise a remotely operable device, and the remotely operable device may comprise a transmitter 64 and a receiver 66 with the receiver being interfaced to the solenoid or other element of the first control such that receipt of a suitable wireless signal by the receiver solenoid causes the solenoid to move or be moved be tween the movement position and the lock position. Optionally, the communication between the control switch 61 and the valve 58 may be through a wired connection. It should be recognized that the operation of the first lock valve 58 may be accomplished manually as well, or permit both electrical operation and manual operation.

In some implementations of the support assembly 10, a second support arm 70 may be utilized which is movable with respect to the first support arm. The second support arm 70 may be pivotable with respect to the first support arm, and may be pivotable about a second pivot axis 72 with respect to the first support arm. The second pivot axis 72 may be substantially vertically oriented and the second support arm may thus pivot in a substantially horizontal plane. The second support arm may have a second inboard end 74 and a second outboard end 76, with the second inboard end 74 being mounted on the first support arm in some embodiments. A second pivot joint 80 may pivotally mount the second support arm to the first support arm, and may mount the second inboard end 74 of the second support arm to the first outboard end 26 of the first support arm. The second pivot joint 80 may comprise a second spindle 82 and a second collar 84 which receives the second spindle. The second spindle may be mounted on the first support arm and the second collar may be mounted on the second support arm.

A second position locking assembly 90 may be configured to lock a selected position of the second support arm 70 with respect to the first support arm 20, and may be located at the second pivot joint 80. The second position locking assembly 90 may be similar or substantially identical to the first position locking assembly 40, and may include a second hydraulic motor 92 which is mounted on the second pivot joint, which may have a fluid input 94 and a fluid output 96 with a fluid path defined between the input and output such that fluid movement on the fluid path between the input and output is capable of operating the hydraulic motor. The second hydraulic motor 92 may be of similar configuration to the first hydraulic motor with similar or identical rotor and housing as disclosed herein. The second position locking assembly 90 may also include a second lock valve 100 which is in communication with the second hydraulic motor 92 and is configured to selectively block fluid movement through the fluid path through the motor 92, and the valve may have a movement condition which permits substantially free flow of fluid through the fluid path of the second fluid motor and a lock condition which resists free flow of fluid through the fluid path of the motor 92. The second lock valve may be operated in a manner similar to the first lock valve to selectively lock and unlock the second support arm to permit movement of the second support arm with respect to the first support arm when the second lock valve is moved into the movement condition, and resist movement when the second lock valve is moved to the lock condition.

The second position locking assembly 90 may also include a second control 102 which may be configured to actuate the second lock valve 100 between the movement and lock conditions. Similar to the first control 60, a second control switch 103 of the second control 102 may have a movement position in which the second lock valve is in the movement condition and a lock position in which the second lock valve is in the lock condition. The second control 102 may comprise an electrically operable device, and may include a solenoid 104 acting on the lock valve 100, and may be remotely operable utilizing a transmitter and a receiver. In some embodiments, the transmitter may comprise a transmitter 64 which also is associated with the first control 60, and is also capable of transmitting to receiver 108 which is associated with solenoid 104. Optionally, a separate and distinct transmitter may be utilized for the second control 102. In some embodiments, the valves 58, 100 may be separately operable of each other so that one pivot joint may be locked independently of the other pivot joint, and at separate times, while the joints may be locked substantially simultaneously if desired.

In some embodiments, the movement condition of the lock valves may provide some degree of resistance to fluid movement through the valve, and thus slow the flow of fluid through the associated motor, to provide a degree of resistance to movement of the elements connected by the associated pivot joint and facilitate smooth movement of the elements with respect to each other.

It may be recognized that in addition to providing a lock capability for one or more of the pivot joints, the motor or motors associated with the pivot joints may also be utilized to actively operate the joints and pivot the respective elements connected at the pivot joint with respect to each other into a desired orientation. However, utilizing the locking motors to actuate and actively operate the joints requires hydraulic fluid supply lines to extend between the controls and the motors or at least from a hydraulic fluid supply. In contrast, selectively blocking flow through the motor or motors at the joints provides a relatively passive braking system that does not require active hydraulic pressure or power.

An illustrative system utilizing the support assembly 10 may include a tool mounted on the first support arm 20 or the second support arm 70. In an illustrative application, the system may comprise a motor, such as a hydraulic motor, for operating a valve such as an underground valve utilized to control the flow of water or other liquids through a supply network. The hydraulic motor may be mounted directly on the second support arm, or may be mounted on additional structure linking the motor to the second support arm, and such structure may include pivot joints and telescoping elements. In such applications, the controls for the motor of the tool 110 as well as controls associated with the first and second position locking assemblies may be located at an end of the structure such as at the motor. Those skilled in the art will appreciate various other configurations that may be possible.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps disclosed in the text and/or the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A pivoting support assembly with a selective position locking capability, the assembly comprising;
 a base;
 a first support arm movable with respect to the base;
 a first pivot joint pivotally mounting the first support arm to the base;
 a first position locking assembly configured to lock a selected position of the first support arm with respect to the base, the first position locking assembly comprising:
  a first hydraulic motor mounted on the first pivot joint and having a fluid input and a fluid output with a fluid path defined therebetween such that fluid movement on the fluid path between the fluid input and the fluid output operates the first hydraulic motor; and
  a first lock valve in communication with the first hydraulic motor and configured to selectively block fluid movement through the fluid path of the motor.

2. The assembly of claim 1 wherein the first lock valve is in communication with at least one of the fluid input and the fluid output of the hydraulic motor to block fluid movement through the at least one of the fluid input and the fluid output.

3. The assembly of claim 1 wherein the first lock valve forms a fluid circuit with the fluid path of the hydraulic motor to selectively block any fluid movement along the fluid path through the first hydraulic motor.

4. The assembly of claim 1 wherein the first support arm is pivotable with respect to the base about a first pivot axis.

5. The assembly of claim 1 wherein the first position locking assembly is located at the first pivot joint.

6. The assembly of claim 1 wherein the first hydraulic motor comprises a housing and a rotor, the housing being fixed to one of the base and the first support arm and the rotor being fixed to another one of the base and the first support arm.

7. The assembly of claim 1 wherein the first pivot joint includes a first spindle and a first collar receiving the first spindle, the first hydraulic motor including a housing and a rotor, the housing being fixed to one of the first spindle and the first collar, and the rotor being fixed to another one of the first spindle and the first collar.

8. The assembly of claim 1 wherein the first lock valve is characterized by having a movement condition permitting substantially free flow of fluid through the fluid path of the first fluid motor and a lock condition resisting the free flow of fluid through the fluid path of the first fluid motor.

9. The assembly of claim 8 wherein the movement condition corresponds to a substantially open condition of the first lock valve and the lock condition corresponds to a substantially closed condition of the first lock valve.

10. The assembly of claim 8 wherein the first position locking assembly includes a first control configured to actuate the first lock valve between the movement condition and the lock condition.

11. The assembly of claim 10 wherein the first position locking assembly includes an electrically operable device configured to move the first lock valve between the movement condition and the lock condition.

12. The assembly of claim 11 wherein the electrically-operable device comprises a solenoid.

13. The assembly of claim 1 additionally comprising a tool mounted on the first support arm such that a position of the tool is movable by movement of the first support arm with respect to the base.

14. The assembly of claim 13 wherein the tool comprises a valve operating device.

15. The assembly of claim 1 additionally comprising a second support arm mounted on and movable with respect to the first support arm, a second pivot joint pivotally mounting the second support arm to the first support arm, and a second position locking assembly configured to lock a selected position of the second support arm with respect to the first support arm.

16. The assembly of claim 15 wherein the second support arm is pivotable with respect to the first support arm about a second pivot axis different than a first pivot axis of the first pivot joint.

17. The assembly of claim 15 wherein the second position locking assembly is located at the second pivot joint.

* * * * *